United States Patent
Tang et al.

(10) Patent No.: US 9,634,955 B2
(45) Date of Patent: Apr. 25, 2017

(54) OPTIMIZING DATA TRANSFERS IN CLOUD COMPUTING PLATFORMS

(71) Applicant: MICROSOFT CORPORATION, Redmond, WA (US)

(72) Inventors: Jun Tang, Shanghai (CN); Nicolaas Deodorus Peelen, Shanghai (CN); Hui Wang, Shanghai (CN); Xiaoting Zhu, Shanghai (CN); Tao Zhao, Shanghai (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 176 days.

(21) Appl. No.: 14/056,630

(22) Filed: Oct. 17, 2013

(65) Prior Publication Data

US 2015/0113117 A1    Apr. 23, 2015

(51) Int. Cl.
*H04L 12/911* (2013.01)
*H04L 12/801* (2013.01)
(Continued)

(52) U.S. Cl.
CPC .......... *H04L 47/70* (2013.01); *H04L 41/0823* (2013.01); *H04L 43/0876* (2013.01);
(Continued)

(58) Field of Classification Search
CPC ..... H04L 1/0026; H04L 1/0009; H04L 67/10; H04L 47/10; H04L 41/08237;
(Continued)

(56) References Cited

U.S. PATENT DOCUMENTS 7,047,309 B2 * 5/2006 Baumann et al. ............ 709/232
8,745,267 B2 * 6/2014 Luecke et al. ............... 709/241
(Continued)

FOREIGN PATENT DOCUMENTS

WO    2007127401 A2    11/2007

OTHER PUBLICATIONS

Heaton, John, "Solutions for High-speed Data Transfer: Moving Data in the Era of Big Data", Published on: Apr. 5, 2012, Available at: http://www.airi.org/petabyte/plenary%202%20aspera.pdf.
(Continued)

*Primary Examiner* — Chirag R Patel
(74) *Attorney, Agent, or Firm* — Shook, Hardy & Bacon L.L.P.

(57) ABSTRACT

In various embodiments, methods and systems for optimizing data transfer are provided. Data transfer optimization is accomplished by a data transfer optimization server. A data transfer session is initiated. The initiation of the data transfer session comprises analyzing transfer parameters for one or more data-source devices. An optimum number of concurrent network calls is calculated for the data transfer session. The calculation is based on the data transfer parameters. At least a portion of the optimum number of concurrent network calls is allocated for executing the data transfer session. The transfer parameters are monitored for changes. The optimum number of concurrent network calls is updated for the data transfer session based on a triggering event associated with the data transfer session. Updating the optimum number of concurrent network calls comprises recalculating the optimum number of concurrent network calls based on the transfer parameters after the trigger event.

20 Claims, 7 Drawing Sheets

(51) Int. Cl.
*H04L 29/08* (2006.01)
*H04L 12/24* (2006.01)
*H04L 12/26* (2006.01)

(52) U.S. Cl.
CPC ............... *H04L 47/10* (2013.01); *H04L 67/06* (2013.01); *H04L 67/10* (2013.01); *H04L 47/828* (2013.01)

(58) Field of Classification Search
CPC .............. H04L 41/0823; H04L 43/0876; H04L 47/828; G06F 8/443; G06G 2209/5019
See application file for complete search history.

(56) References Cited

U.S. PATENT DOCUMENTS

| | | | |
|---|---|---|---|
| 2002/0082811 A1* | 6/2002 | Honjas et al. | 703/2 |
| 2006/0031537 A1* | 2/2006 | Boutboul et al. | 709/228 |
| 2008/0219158 A1 | 9/2008 | Mukraj et al. | |
| 2011/0196971 A1 | 8/2011 | Reguraman et al. | |
| 2011/0307573 A1 | 12/2011 | Lingafelt et al. | |
| 2012/0281706 A1* | 11/2012 | Agarwal et al. | 370/395.53 |
| 2013/0003543 A1 | 1/2013 | Ludwig | |
| 2013/0013666 A1 | 1/2013 | Ben-Yehuda et al. | |

OTHER PUBLICATIONS

"Attunity CloudBeam On-Premises to Cloud Replication", Published on: Apr. 3, 2013, Available at: http://www.attunitycloudbeam.com/services/cloud-replication.

"Integrating your On-Premise Applications with Cloud Applications", Retrieved on: Apr. 3, 2013, Available at: http://www.oracle.com/technetwork/topics/cloud/whatsnew/integrating-on-premise-apps-cloud-300329.pdf.

"Developing Big Data Solutions on Windows Azure", Published on: Mar. 2013, Available at: http://ya.topbloger.ru/FILES/2013/03/Developing_Big_Data_Solutions_on_Windows_Azure.pdf.axdx.

"International Search Report and Written Opinion Issued in PCT Patent Application No. PCT/US2014/060209", Mailed Date: Feb. 5, 2015, 14 Pages.

"International Preliminary Report on Patentability Issued in PCT Application No. PCT/US2014/060209", Mailed Date: Sep. 21, 2015, 9 Pages.

"International Preliminary Report on Patentability Issued in PCT Application No. PCT/US2014/060209", Mailed Date: Dec. 11, 2015, 10 Pages.

* cited by examiner

OPTIMIZING DATA TRANSFERS IN CLOUD COMPUTING PLATFORMS

BACKGROUND

Cloud computing platforms may offer building, deployment and management functionality for different types of applications and services. In this regard, existing applications may be migrated and/or function from on-premise systems with cloud computing platforms. However, conventional data transfer techniques are not effective in facilitating data migration or periodic transfers of data between on-premise systems and cloud computing platforms.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide methods and systems for optimizing data transfer. This may be accomplished by a data transfer optimization server. A data transfer session is initiated. The initiation of the data transfer session comprises analyzing transfer parameters for one or more data-source devices. An optimum number of concurrent network calls is calculated for the data transfer session. The calculation is based on the transfer parameters. At least a portion of the optimum number of concurrent network calls is allocated for executing the data transfer session. Allocating concurrent network calls may include executing the data transfer session with the allocated number of concurrent calls. The transfer parameters are monitored for changes. The optimum number of concurrent network calls is updated for the data transfer session based on a triggering event associated with the data transfer session. Updating the optimum number of concurrent network calls comprises recalculating the optimum number of concurrent network calls based on the transfer parameters after or at the triggering event. The optimum number of concurrent network calls recalculated can be used to execute the data transfer session.

BRIEF DESCRIPTION OF THE DRAWINGS

The present invention is described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion below, embodiments of the present invention are described with reference to an on-premise system and a cloud computing platform; however, the transfer of data between the on-premise system and the cloud computing platform is merely exemplary and it is contemplated that the techniques described may be extended to other implementation contexts.

Typically, a cloud computing platform acts to store data or run service applications in a distributed manner. A cloud computing platform may span wide geographic locations, including countries and continents. The service-application components (e.g., tenant infrastructure or tenancy) of the cloud computing platform may include nodes (e.g., computing devices, processing units, or blades in a server rack) that are allocated to run one or more portions of a tenant's service applications. When more than one separate service applications are being supported by the nodes, the nodes may be partitioned into virtual machines or physical machines that concurrently run the separate service applications, respectively, in individualized computing environments that support the resources and/or operating system specific to each service application. Further, each service application may be divided into functional portions such that each functional portion is able to run on a separate virtual machine.

Administrators supporting on-premise systems may migrate existing systems to a cloud computing platform. For example, an administrator can migrate a relational database and the data in the tables for an SQL database application to a cloud computing platform that supports SQL databases. Further, customers of the cloud computing platform datacenters often have business applications running in a private enterprise system (e.g., server managed by a customer that is geographically remote from the datacenter) that interact with software being run on the resources in the datacenters. In this regard, these applications may require transfer of data to and from the cloud computing platform to support the operation of these applications. The transferred data may further include associated information of the data including metadata of data files.

Administrators supporting such on-premise migration and data transfer face a challenge in migrating data from on-premise systems because current data transfer tools and systems are not effective in facilitating the transfer of data between on-premise systems and cloud computing platforms. Current data transfer tools are not built for the infrastructure of the cloud computing platform and cannot support data transfer in said platform. For example, the cloud computing platform infrastructure may support data transfer to a plurality of datacenters at different geographic locations. In this regard, a user using a single credential may migrate data to one or more storage systems in the cloud computing platform.

Further, conventional data transfer tools fail to perform real-time analysis of transfer parameters that impact the maximum throughput available for transferring data. On-premise data migration to a cloud computing platform involves several different transfer parameters that may be analyzed during a data transfer session in order to set data transfer configurations for a data transfer session. For example, an on-premise migration may involve several different computing devices each with individual transfer parameters and the cloud computing platform includes shared datacenter resources and virtualization, each of the on-premise computing devices and cloud computing platform impacting the data transfer session. As such, systems and methods that account for both the on-premise systems and the infrastructure of cloud computing platforms may further facilitate data transfer to and from the cloud computing platform.

Generally, embodiments of the present invention provide simple and efficient methods and systems for optimizing data transfer in cloud computing platforms. In particular, a data transfer optimization server supports bidirectional transfer of data in a cloud computing platform. It is contemplated that techniques described herein can be used in transferring data between cloud computing platforms and also within cloud computing platforms. In an exemplary embodiment, data may be transferred to or from an on-premise system to a cloud computing platform. Data transfer refers to the physical transfer of data over a point-to-point or point-to-multipoint communication channel.

In embodiments, data transfer can be executed using a plurality of concurrent network calls from a data transfer optimization server to the cloud computing platform to transfer data. By way of example, a plurality of Hypertext Transfer Protocol (HTTP) network calls may be used to transfer data. HTTP is an application protocol for distributed and collaborative information systems. HTTP functions as a request-response protocol in a client-server computing model. HTTP includes an underlying transport layer protocol (e.g., Transmission Control Protocol (TCP)). The data transfer optimization server may initiate multiple concurrent network calls in order to transfer data (e.g., data chunks) such that the data is transferred at a certain bandwidth. Bandwidth refers to the average rate of successful data transfer using the concurrent network data calls or the throughputs, in bits, during a data transfer session. Throughput may be expressed in other format rates (e.g., Mbits/s or Gbit/s). The throughput for transferring a file to or from the cloud computing platform can be calculated by dividing the file size by the time it takes to transfer the file. Naturally, other methods for calculating throughput are contemplated with embodiments of the present invention. The throughput may further be related to transfer parameters. Transfer parameters refer to data transfer implementation constraints that impact the maximum throughput available for data transfer. By way of example, transfer parameters may include, among other things, local computer hardware (e.g., central processing unit (CPU) speed and memory size), local network type, source file size, geographic location of destination datacenter, current date and time, service level agreements, and prioritization.

Embodiments of the present invention may be supported by the data transfer optimization server. The data transfer optimization server is configured to support the interfacing between the on-premise system and the cloud computing platform, and also to support real-time analysis of the data transfer session. The data transfer optimization server interface with the cloud computing platform may be supported in part by an application programming interface (API) that specifies how software components of the data transfer optimization server interacts with software components of the cloud computing platform. For example, an API library that includes specifications for routines, data structures, object classes, and variables may support the interaction between the data transfer optimization server and the cloud computing platform. These APIs include configuration specifications for the cloud computing platform such that the data transfer optimization server may communicate with the cloud computing platform infrastructure. For example, a credentialing routine may be integrated in the data transfer optimization component to support usernames and passwords to access particular storage accounts. Similarly, particular data transfer optimization functions such as increasing and decreasing concurrent network calls, or pausing and resuming data transfer sessions, as described in more detail herein, may be supported at both the data transfer optimization server and the cloud computing platform by APIs for communicating messages of actions taken during the data transfer session. Any other variations and combinations thereof are contemplated with embodiments of the present invention.

Further, real-time analysis of the data transfer session and transfer parameters in embodiments of the present invention may be performed using a plurality of different algorithms. In one embodiment, an optimum number of concurrent network calls may be calculated and based on a triggering event, the optimum number of concurrent network calls can be recalculated to maintain the data transfer session at an optimum number of concurrent network calls for the transfer parameters at that time. Generally, the optimum number of concurrent network calls may be associated with threshold criteria of each of the transfer parameters that adds or subtracts a concurrent number of network calls when a selected transfer parameter meets or fails to meet a threshold criterion. As such, the optimum number of concurrent network calls can be dependent on transfer parameters of the data transfer session.

Another embodiment may calculate the optimum number of concurrent network calls; but allocate a portion of the optimum number of network calls (e.g., a default number of concurrent network calls) that executes the data transfer, and then, periodically measure the average data transfer rate of the data transfer session while the data transfer session uses a different number of concurrent network calls. At each period, the number of concurrent network calls may be increased until the number of concurrent network calls executing the data transfer session matches the calculated optimum number of concurrent network calls. The number of concurrent network calls corresponding to the highest recorded average data transfer rate may then be used for the transfer session.

In addition, a data transfer session having a plurality of files may be assigned a number of concurrent network calls that get distributed to the set of files. Each file may receive a number of concurrent network calls to transfer the particular file in proportion to the size of the individual file. In this regard, a larger file receives more concurrent network calls compared to a smaller file each relative to the total number of concurrent network calls available for the data transfer session. Further, embodiments of the present invention may include a graphical user interface (GUI) having interface features that graphically represent, among other things, the data transfer session information and data transfer parameters. The interface may additionally support functionality such as pausing and resuming data transfer sessions in accordance with embodiments of the present invention.

Accordingly, in a first aspect of the present invention, a system for performing a method for optimizing data transfer sessions is provided. The system includes a data transfer optimization server configured for initiating a data transfer session. Initiating the data transfer session comprises analyzing transfer parameters for one or more data-source devices. The data transfer optimization server is further configured for calculating an optimum number of concurrent network calls for the data transfer session based on the transfer parameters. The data transfer optimization server is also configured for allocating at least a portion of the optimum number of concurrent network calls that execute the data transfer session. The data transfer optimization server is configured for monitoring the transfer parameters for changes in the transfer parameters. The data transfer optimization server is also configured for updating the optimum number of concurrent network calls for the data transfer session based on a triggering event associated with the data transfer session. Updating the optimum number of concurrent network calls comprises recalculating the optimum number of concurrent network calls based on the transfer parameters at or after the triggering event.

In a second aspect of the present invention, one or more computer-readable media storing computer-useable instructions that, when used by one or more computing devices, cause the one or more computing devices to perform a method for optimizing data transfers. The method includes initiating a data transfer session. The data transfer session is associated with a default number of concurrent calls. Initiating the data transfer comprises analyzing transfer parameters for one or more data-source devices. The method also includes calculating an optimum number of concurrent network calls for the data transfer session based on the transfer parameters. The method further includes allocating the default number of concurrent network calls for the data transfer session. The method also includes, upon a triggering event, identifying a target number of concurrent calls between the default number of concurrent calls and the optimum number of concurrent calls, the target number of concurrent calls is used during at least a portion of the data transfer session.

In a third aspect of the present invention, a method for optimizing data transfer between private enterprise systems and cloud computing platforms is provided. The method includes initiating a data transfer session associated with a default number of concurrent calls. Initiating the data transfer comprises analyzing transfer parameters for one or more data-source devices. The method includes calculating an optimum number of concurrent network calls for the data transfer session based on the transfer parameters; calculating the optimum number of concurrent network calls includes: comparing each value associated with each of the transfer parameters of each of the one or more data-source devices to a threshold criteria; and configuring the sum of the default number of concurrent calls and an added number of network calls, based on a selected transfer parameter meeting or exceeding the threshold criteria, as the optimum number of concurrent network calls. The method also includes allocating the default number of concurrent network calls that execute the data transfer session; allocating the default number of concurrent network calls for the data transfer session, which comprises determining the size of each individual file to be transferred from the one or more data-source devices; and assigning a number of concurrent network calls to each individual file in proportion to the size of the individual file. The number of concurrent network calls is assigned from the default number of concurrent network calls. The method also includes identifying a target number of concurrent network calls for the data transfer session. Identifying the target number of concurrent network calls comprises performing the following two or more times: recording an average bandwidth of the data transfer session for a predefined period and increasing an allocated number of concurrent network calls by adding to the default number of concurrent network calls. The method further includes, when the allocated number of concurrent network calls has been increased to match the optimum number of concurrent network calls, evaluating each recorded average bandwidth and a number of concurrent network calls for each recorded average bandwidth to identify a highest average bandwidth recorded. The method includes allocating the target number of concurrent network calls for executing the data transfer session. The target number of concurrent network calls is the number of concurrent networks calls that corresponds to the highest average bandwidth recorded. The method also includes displaying a graphical user interface (GUI) comprising graphical representations of the data transfer parameters.

Figure 1:
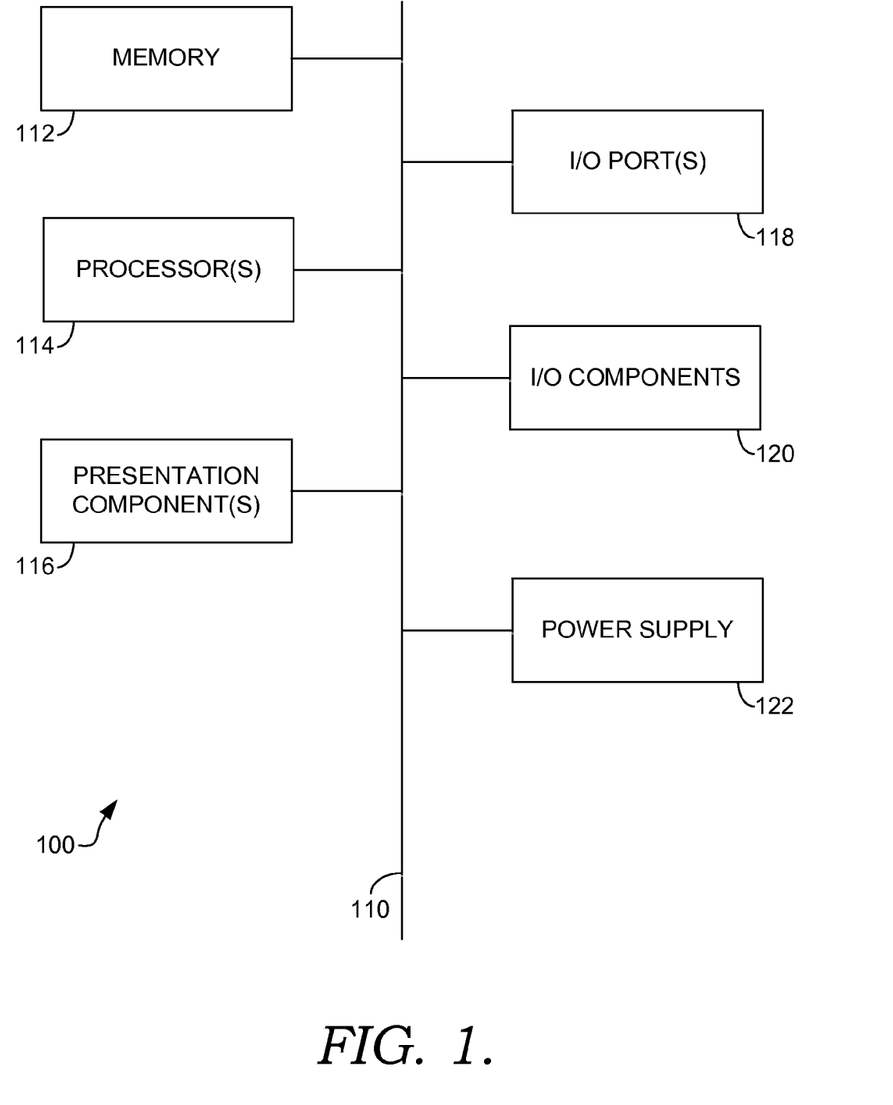
FIG. 1 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
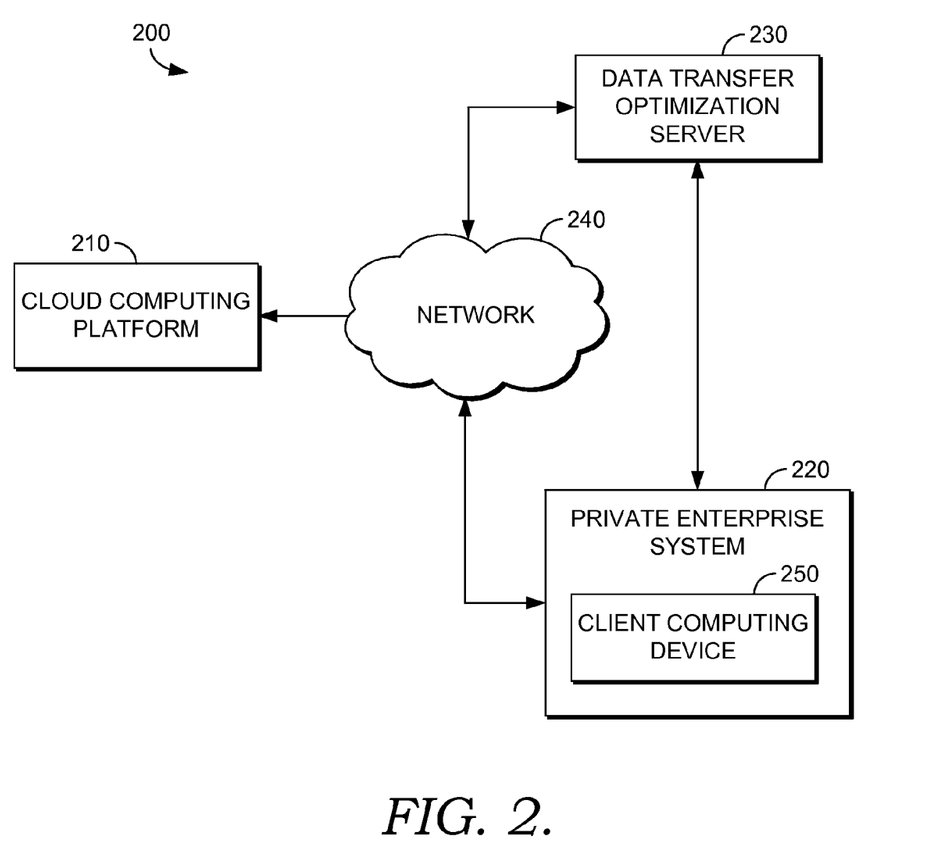
FIG. 2 is a block diagram of an exemplary distributed storage system in which embodiments of the invention may be employed.

With additional reference to FIG. 2, a block diagram depicting an exemplary cloud computing platform operating environment 200 suitable for use in embodiments of the invention is described. Generally, the cloud computing platform operating environment 200 illustrates an environment for optimizing data transfer in cloud computing platforms. Embodiments of the present invention also provide a system and method of optimizing data transfer sessions in a cloud computing platform based on a data optimization server that is configured based on the cloud computing platform and further monitoring data transfer parameters that impact the maximum throughput for a data transfer session. Among other components not shown, the cloud computing platform operating environment 200 generally includes a cloud computing platform 210, a private enterprise system 220, a data transfer optimization server 230 all in communication with one another via a network 240.

With continued reference to FIG. 2, the network 240 may include, without limitation, one or more local area networks (LANs) and/or wide area networks (WANs). Such networking environments are commonplace in offices, enterprise-wide computer networks, intranets and the Internet. The cloud computing platform 210 and the private enterprise system 220 may each include several storage servers/systems (not shown) for storing the data transferred between the two systems. Each of the systems may be linked together by the network 240 backbone spanning across the zones. Zones may refer to particular buildings, data centers, and geographic regions providing a storage service. The content and volume of information stored by a storage service is not intended to limit the scope of embodiments of the present invention in any way.

In some embodiments, one or more of the illustrated components/modules may be implemented as stand-alone applications. Any number of client computing devices, data optimization servers, and cloud computing platforms, may be employed in the computing system 200 within the scope of embodiments of the present invention. Each may comprise a single device/interface or multiple devices/interfaces cooperating in a distributed environment. For instance, the data transfer optimization server 230 may comprise multiple devices and/or modules arranged in a distributed environment that collectively provide the functionality of the data optimization server described herein.

As used herein, the phrase "private enterprise system" is not meant to be limiting, but may encompass a number of applications and services systems that transfer data to and from the cloud computing platform. Additionally, other components/modules not shown also may be included within the cloud computing platform 210. For example, a cloud computing platform is configured to allocate virtual machines within a data center for use by a service application. The cloud computing platform 210 also may be a public cloud, a private cloud, or a dedicated cloud. The cloud computing platform 210 may include a data center configured to host and support operation of endpoints in a particular service application. The phrase "application" or "service" as used herein broadly refers to any software, or portions of software, that runs on top of, or accesses storage locations within, the datacenter. In one embodiment, one or more of the endpoints may represent the portions of software, component programs, or instances of roles that participate in the service application.

It should be understood that this and other arrangements described herein are set forth only as examples. Other arrangements and elements (e.g., machines, interfaces, functions, orders, and groupings of functions) can be used in addition to or instead of those shown, and some elements may be omitted all together. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The cloud computing platform 210 acts to store data or run service applications in a distributed manner. For instance, the cloud computing platform 210 functions to run one or more portions of a tenant's service applications. In particular, cloud computing platform 210 is configured to deploy, manage, monitor and maintain service applications. The cloud computing platform 210 may include components that receive or transfer data to other storage components within or outside the cloud computing platform. For example, the cloud computing platform 210 may support an SQL database application which is periodically updated with data from a private enterprise system, or the cloud computing platform 210 may transfer data to another datacenter within the cloud computing platform 210 supporting fault recovery agreements of tenant applications. Any and all such variations and combinations of data to and from the cloud computing platform 210 are contemplated within the scope of embodiments of the present invention.

In addition, the cloud computing platform infrastructure allows for additional functionality not typically provided on individual computing devices or networks of computing devices. In particular, interfacing with a cloud computing infrastructure may include particular software components that are different from conventional data transfer tools. For example, a cloud computing system may include storage servers in a plurality of geographic regions each associated with a single user account. In this regard, a user may, on a cloud computing platform, have access to each of the storage devices even though they are geographically dispersed. Developing an interface that supports the configuration of the cloud computing platform 210 is provided with optimizing data transfer sessions in that the data transfer session are fully supported by the infrastructure of the cloud computing platform, for example, via an graphical user interface and APIs that support messages for executing functionality in accordance with embodiments of the present invention, In addition, the cloud computing platform 210 provides for shared resources that allow for dynamic management of component programs of a service application. In particular, virtual machines instances may be deployed and similarly other resources may vary in usage, as such, having implications on performance (e.g., data transfer sessions). A service model further acts to guide a cloud computing platform in coordinating activities between the deployed service applications and service-application components upon deployment to distributed locations throughout the distributed system. The service model can include a description of the business prioritization and service level agreements for applications and services in the cloud computing platform 210. Although various differing types of functions have been described, it should be understood and appreciated by those of ordinary skill in the art that other suitable functions of the cloud computing platform may be used, and that embodiments of the present invention are not limited to the functionality described herein.

With continued reference to FIG. 2, the private enterprise system 220 includes a client computing device 250 that may include any type of computing device, such as the computing device 100 described with reference to FIG. 1, for example. A plurality of client computing devices may be associated with the private enterprise system 220. It is contemplated that the client computing device 250 data is transferred via a data transfer optimization server using techniques described herein. For example, the data on the client computing device may be accumulated from a plurality of client computing devices of the private enterprise system 220 and transferred. Further, an entire legacy system having a plurality of applications and or services may also include data that is transferred to the client cloud computing platform 210. Also, the client computing device 250 may be used directly by users to operate applications running the cloud computing platform 210 such that data on one or more computing devices are transferred periodically using the data transfer optimization server. Any and all such variations and combinations of data from the private enterprise system 220 transferred to the cloud computing platform 210 are contemplated within the scope of embodiments of the present invention. It is further contemplated that the private enterprise may be an on-premise system of computing devices, a datacenter, or another cloud computing platform transferring data to or from a destination cloud computing platform.

The data transfer optimization server 230 of FIG. 2 is generally configured to automatically and dynamically optimize concurrent network calls that are used to transfer data. Data may generally include chunks of data files of varying sizes that are to be physically transferred to a single location or multiple locations. The data transfer optimization server 230 may be implemented in different arrangements, for example, as a standalone system, or within the private enterprise system, or even within the cloud computing platform. Any number of variations and combinations of the implementations of the data transfer optimization server are contemplated within embodiments of the present invention.

The data transfer optimization server 230 further generates a graphical user interface (GUI) for executing the functions associated with the data transfer optimization server. In particular, the GUI shows real-time data transfer status. The GUI is a portion of the data transfer optimization server 230 with which a user interacts. The GUI may be associated with an application (not shown) that is part of the data transfer optimization server 230. The application is a program designed to assist with the performance of the data transfer optimization method described herein. The data transfer optimization server 230 may generate and display GUI to support functions of data transfer optimization server 230.

Figure 3:
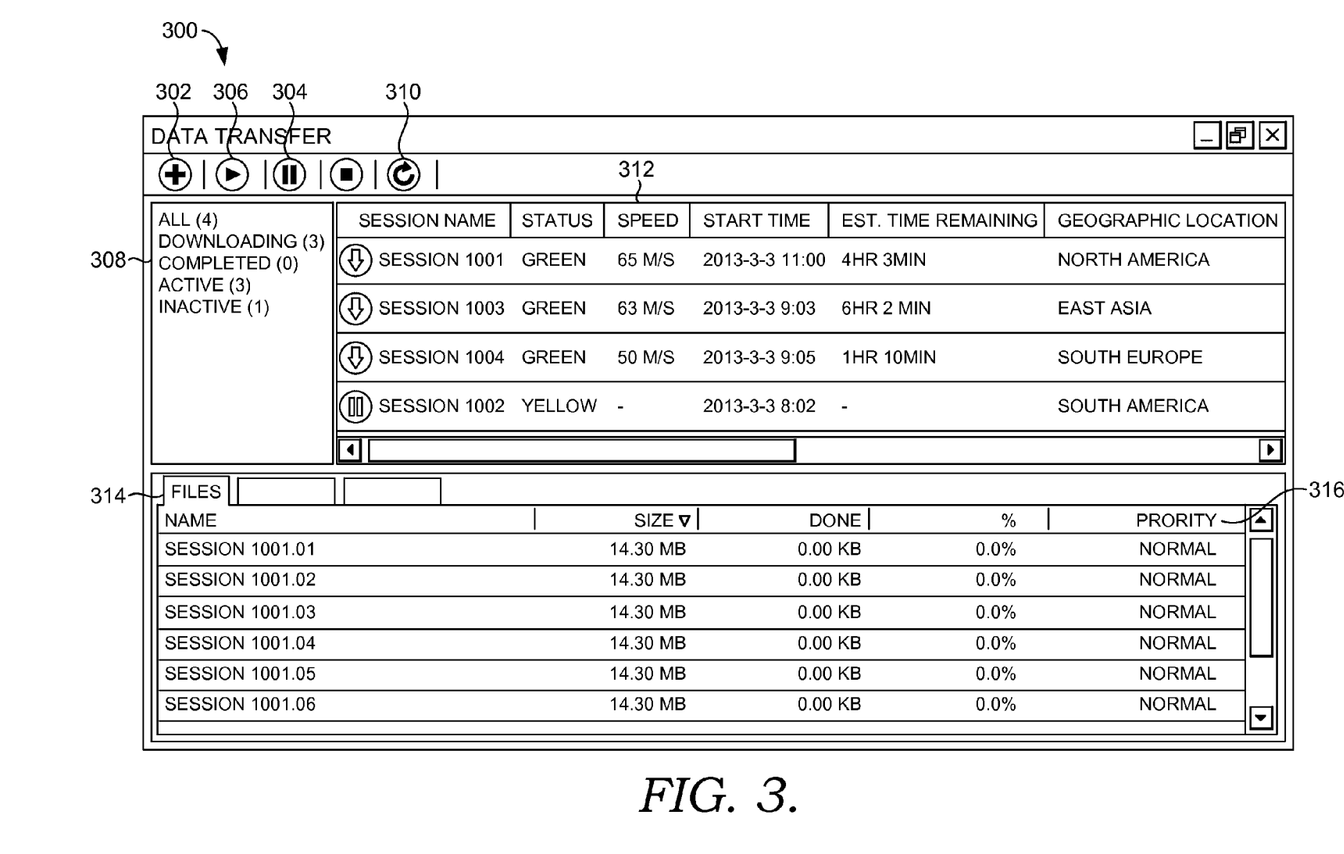
FIG. 3 is a schematic diagram showing a graphical user interface for optimizing data transfer in cloud computing platforms, in accordance with embodiments of the present invention.

With reference to FIG. 3, an exemplary illustration of the GUI of the data transfer optimization server is shown. The GUI can include an initialization icon 302, a pause icon 304, and a resume icon 306 as graphical representations for initiating a data transfer session, pausing the data transfer session, and resuming the data transfer session, respectively. The initialization icon 302 may also be configured to generate an interface for taking additional actions with reference to the data transfer session. For example, changing the priority of the particular data transfer from high to normal or low. A refresh icon 310 may be used to get the most up-to-date information about interface elements and also execute a triggering event that affects the data transfer session. Other types of functionality described with methods of the present invention may further be facilitated by interface elements on the GUI.

The GUI may also include several different portions in the interface that provide different types of information about the data transfer. For example, a first portion 308 may include information about downloads at different stages (e.g., downloading, completed, active and inactive downloads). A second portion 312 may include the data transfer parameters (e.g., network card speed, the local network type (e.g., wireless or wired), the hardware of the client computing device (e.g., CPU and memory), total size of source files, a priority indication, a geographic location of the destination data center, the geographic location of the client computing device, the current date and time for at the location of the date center and current date and time of the destination of the data center) that are associated with each individual data transfer session. A third portion 314 of the interface may include information about individual files associated with each data transfer session. The individual files may also have values for different types of transfer parameters as shown at the fourth portion 316 of the interface. It is contemplated that the particular layout presented in FIG. 3 is merely exemplary; other arrangements of interface features that perform the functions described herein are contemplated with embodiments of the present invention.

Figure 4:
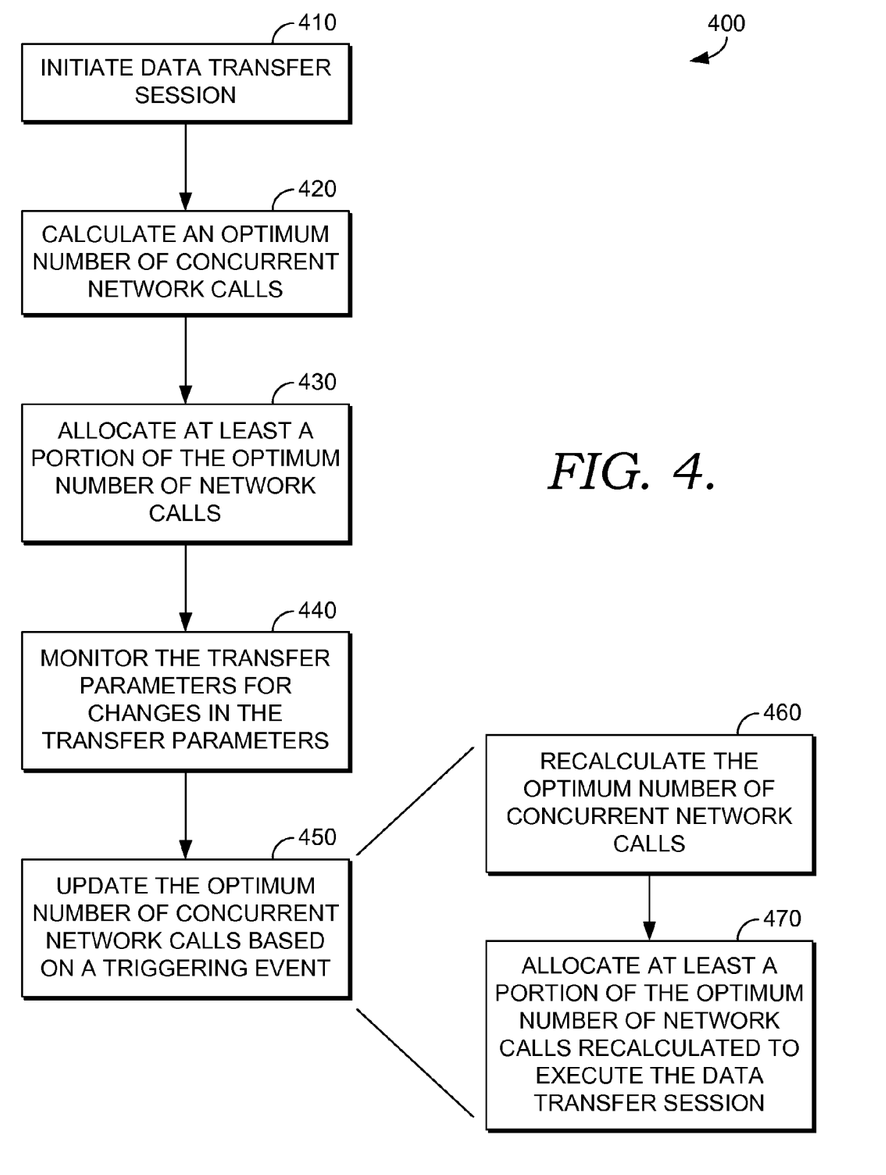
FIG. 4 is a flow diagram showing a method for optimizing data transfer in cloud computing platforms, in accordance with embodiments of the present invention.

Turning now to FIG. 4, a flow diagram is provided that illustrates a method 400 for optimizing data transfer sessions in cloud computing platforms. At block 410, a data transfer session is initiated. The data transfer session may be between a private enterprise system having the one or more data-source devices or one or more data-target devices and a cloud computing platform having one or more data-source devices or one or more data-target devices. An initiated data transfer session may further be paused and resumed. Initiating, pausing, and resuming a data transfer session may be facilitated by a graphical user interface (GUI), the GUI further supports other functionality in accordance with embodiments of the present invention.

Initiating the data transfer session comprises analyzing transfer parameters for one or more data-source devices. In embodiments, the data transfer includes at least two of the following: a network card connection speed; a local network type; a hardware of the one or more data-source devices comprising a computer processing unit (CPU) speed and memory size; a total size of source files to be transferred; a priority associated with data transfer sessions and/or each of the source files; a geographic location of the one or more data-target devices; a geographic location of the data-source device; a current date and time of the geographic location of the one or more data-source devices; and a current date and time of the geographic location of the one or more data-target devices. The transfer parameters may have a theoretical maximum throughput; however, in practice, the actual effective throughput can be lower. For example, other factors that limit actual performance from a network perspective may include higher layer protocol overhead, data packet retransmissions caused by line noise or interference and lost packets in congested intermediate network nodes. Further, device interfaces where one bus transfers data via another can limit the throughput to the slower interface. Moreover, deliberate business prioritization policies and service level agreement in a service model may further limit the maximum throughput. It is further contemplated that all of above-listed transfer parameters may be analyzed and utilized in particular embodiments.

At block 420, an optimum number of concurrent network calls for the data transfer session is calculated. The optimum number of concurrent network calls can be calculated based on the transfer parameters. The optimum number of concurrent network calls refers generally to the maximum supported number of concurrent network calls for a data-source device. Calculating the optimum number of concurrent network calls comprises at least in part determining that a selected transfer parameter from the transfer parameters meets or exceeds a threshold criteria. For example, a value for current date and time may be holiday, such that if the current data and time is a holiday an added number of concurrent network calls assigned to this value may be added to the default number of concurrent network calls. Similarly a priority value may be low, normal, or high such that a high receives an added number of concurrent calls and a low subtracts an added number of concurrent calls. Any variations and combinations of threshold criteria are contemplated with embodiments of the present invention. The optimum number of concurrent network calls can then be configured as the sum of the default number of concurrent network calls and an added or subtracted number of network calls for the selected transfer parameter.

At block 430, at least a portion of the optimum number of concurrent network calls is allocated. Allocating the concurrent network calls can execute the data transfer session. Allocating the concurrent network calls further includes determining the size of each individual file to be transferred from the one or more data-source devices, and assigning a number of concurrent network calls to each individual file in proportion to the size of the individual file. The number of concurrent network calls is assigned from the portion of the optimum number of concurrent network calls.

At block 440, the transfer parameters are monitored for changes. Anyone of the transfer parameters may change in real time due to modifications in the associated infrastructure. The modification affects the transfer session, as such, embodiments of the present invention monitor changes and recalculate an optimum number of concurrent network calls for the data transfer session. At block 450, the optimum number of concurrent network calls for the data transfer session is updated. The updated optimum number of concurrent network calls may be based on a triggering event. The triggering event can be a predefined period such that upon expiration of the predefined period the transfer parameters are analyzed for updating the optimum number of concurrent network calls based on the transfer parameters at or after the triggering event. At block 460, the optimum number of concurrent network calls is recalculated, and then at block 470, at least a portion of the optimum number of network calls recalculated is allocated to execute the data transfer session.

Figure 5:
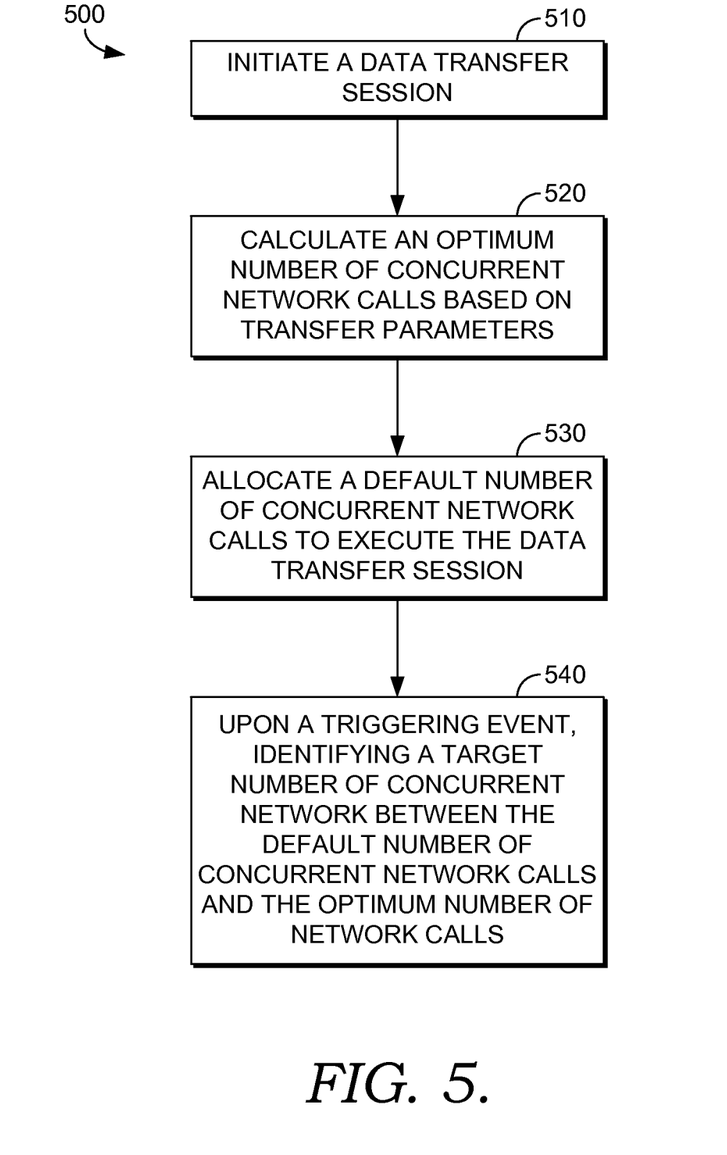
FIG. 5 is a flow diagram showing a method for optimizing data transfer in cloud computing platforms, in accordance with embodiments of the present invention.

Turning now to FIG. 5, a flow diagram is provided that illustrates a method 500 for optimizing data transfer in cloud computing platforms. At block 510, a data transfer session is initiated. The data transfer session can be associated with a default number of concurrent calls. The data transfer session includes a number of default network calls determined that may be based on a default configuration and/or transfer parameters of the private enterprise system. At block 520, an optimum number of concurrent network calls is calculated for the data transfer session based on the transfer parameters. At block 530, the default number of concurrent network calls is allocated such that the data transfer session is executed. At block 540, upon a triggering event, a target number of concurrent calls is identified between the default number of concurrent calls and the optimum number of concurrent calls. The target number of concurrent calls is used during at least a portion of the data transfer session.

Figure 6:
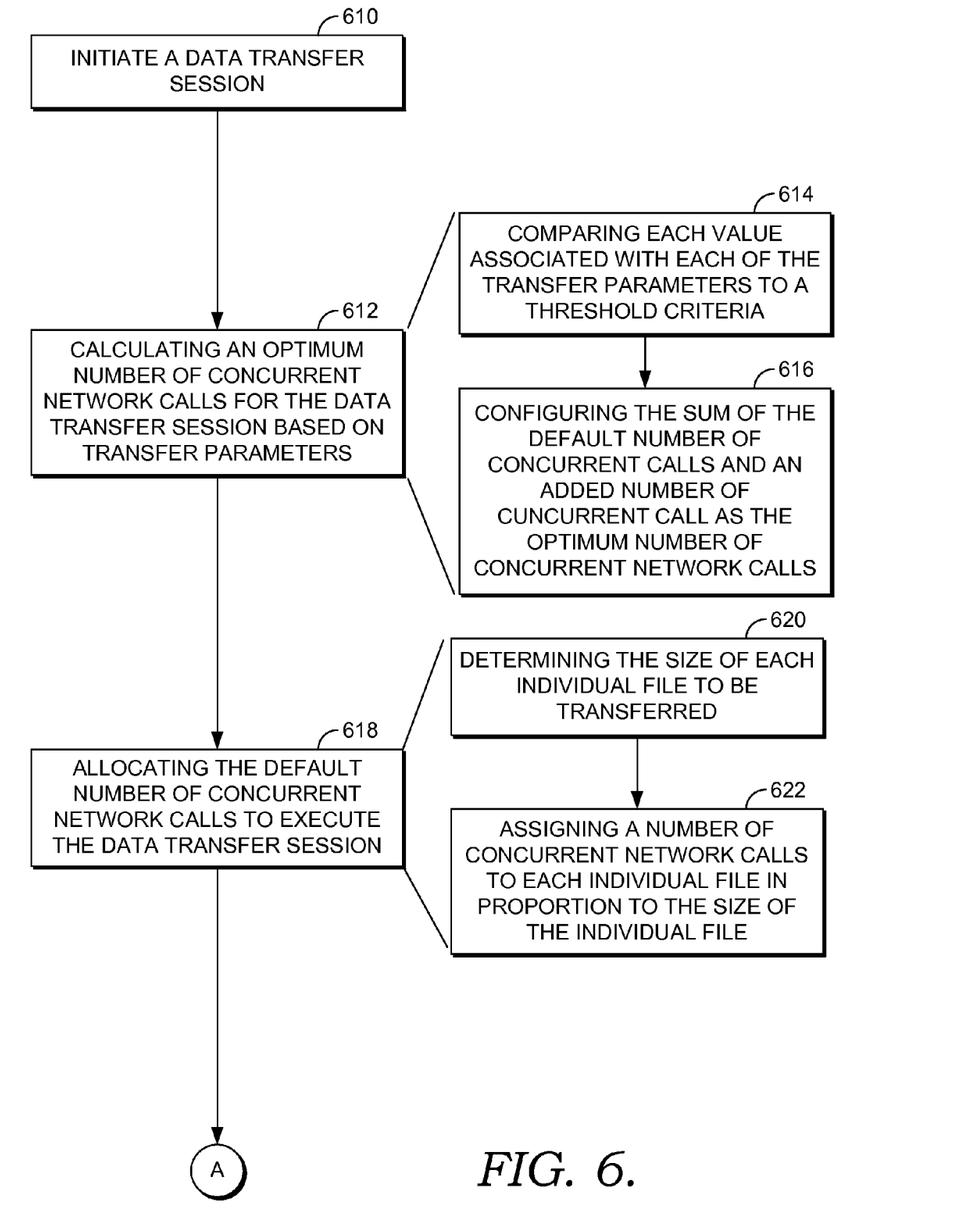
FIG. 6 is a flow diagram showing a method for optimizing data transfer in cloud computing platforms, in accordance with embodiments of the present invention.

Turning now to FIG. 6, a flow diagram is provided that illustrates a method 600 for optimizing data transfer between private enterprise systems and cloud computing platforms. At block 610, a data transfer session is initiated. At block 612, an optimum number of concurrent network calls for the data transfer session is calculated based on the transfer parameters. Calculating an optimum number of concurrent network calls comprises, at block 614, comparing each value associated with each of the transfer parameters of each of the one or more data-source devices to a threshold criteria and at block 616 configuring the sum of the default number of concurrent calls and an added number of network calls, based on a selected transfer parameter meeting or exceeding the threshold criteria, as the optimum number of concurrent network calls.

At block 618, the default number of concurrent network calls is allocated to execute the data transfer session. Allocating the default number of concurrent network calls for the data transfer session comprises: at block 620, determining the size of each individual file to be transferred from the one or more data-source devices, and at block 622, assigning a number of concurrent network calls to each individual file in proportion to the size of the individual file. The number of concurrent network calls is assigned from the default number of concurrent network calls.

At block 624, a target number of concurrent network calls is identified for the data transfer session, identifying the target number of concurrent network calls comprises performing the following two or more times: at block 626, recording an average bandwidth of the data transfer session for a predefined period, and at block 628, increasing an allocated number of concurrent network calls by adding to the default number of concurrent network calls. The default number of concurrent network calls may be increased by a predefined number of calls, although other implementations are contemplated. At block 630, a determination is made whether the number of concurrent network calls matches the optimum number of concurrent network calls. If the number of concurrent network calls and the optimum number of concurrent network calls do not match 632, the method returns to block 626; however if the number of concurrent network calls and the optimum number of concurrent network calls do match 634, at block 636, the target number of concurrent network calls for the data transfer session is allocated to execute the data transfer session. The target number of concurrent network calls is the number of concurrent networks calls that corresponds to the highest average bandwidth recorded. At block 638, a graphical user interface (GUI) comprising graphical representations of the transfer parameters is displayed.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages obvious and inherent to the structure.

It will be understood that certain features and sub-combinations are of utility and may be employed without reference to other features or sub-combinations. This is contemplated by and is within the scope of the claims.

The invention claimed is:

1. A system for performing a method for optimizing data transfers, the system comprising:
   a data transfer optimization server configured for:
   initiating a data transfer session, wherein initiating the data transfer session comprises analyzing transfer parameters for one or more data-source devices;
   calculating an optimum number of concurrent network calls for the data transfer session based on a default optimum number of concurrent calls for the data transfer session and an added number of concurrent network calls of the transfer parameters,
   allocating a portion of the optimum number of concurrent network calls that execute the data transfer session, wherein allocating the portion of the optimum number of concurrent network calls comprises:
   determining a size of each individual file to be transferred from the one or more data-source devices; and
   upon determining the size of each individual file to be transferred, assigning a number of concurrent network calls to each individual file in proportion to a size of the individual file, wherein larger files are allocated a higher number of the optimum number of concurrent network calls than smaller files.

2. The system of claim 1, wherein the data transfer optimization server is further configured for:
   pausing the data transfer session; and
   resuming the data transfer session.

3. The system of claim 1, wherein the data transfer optimization server is configured for displaying a graphical user interface (GUI), wherein the GUI supports a plurality of the functions of the data transfer optimization server.

4. The system of claim 1, further comprising:
   a private enterprise system having the one or more data-source devices or one or more data-target devices; and
   a cloud computing platform having the one or more data-source devices or the one or more data-target devices.

5. The system of claim 1, the data transfer optimization server configured for:
   monitoring the transfer parameters for changes in the transfer parameters;
   updating the portion of the optimum number of concurrent network calls for the data transfer session based on a triggering event associated with the data transfer session, wherein updating the optimum number of concurrent network calls comprises recalculating the optimum number of concurrent network calls based on the transfer parameters.

6. The system of claim 1, wherein calculating the optimum number of concurrent number of concurrent network calls comprises:
   determining that a selected transfer parameter from the transfer parameters meets or exceeds a threshold criteria; and
   configuring the optimum number of concurrent network calls based on the default optimum number of concurrent network calls and an added number of concurrent network calls for the selected transfer parameter at least meeting the threshold criteria.

7. The system of claim 5, wherein the triggering event is a change in at least one transfer parameter determined based on continuous monitoring of the transfer parameters.

8. The system of claim 5, wherein the triggering event in a predefined period, wherein expiration of the predefined period triggers analyzing the transfer parameters for updating the optimum number of concurrent network calls based on the transfer parameters.

9. The system of claim 1, wherein calculating the optimum number of concurrent network calls comprises at least in part:
determining that a second selected transfer parameter from the transfer parameters fails to meet a threshold criteria; and
configuring the optimum number of concurrent network calls as the difference of the optimum number of concurrent network calls and a subtracted number of concurrent network calls for the selected transfer parameter failing to meet the threshold criteria.

10. One or more computer storage media storing computer-useable instructions that, when used by one or more computing devices, causes the one or more computing devices to perform a method for optimizing data transfers, the method comprising:
initiating a data transfer session, the data transfer session associated with a default number of concurrent calls, wherein initiating the data transfer comprises analyzing transfer parameters for one or more data-source devices;
calculating an optimum number of concurrent network calls for the data transfer session based on a default optimum number of concurrent calls for the data transfer session and an added number of concurrent network calls of the transfer parameters;
allocating a default number of concurrent network calls to execute the data transfer session; and
upon a triggering event, identifying a target number of concurrent calls between the default number of concurrent calls and the optimum number of concurrent calls, wherein the target number of concurrent network calls is allocated based on a number of concurrent network calls that corresponds to a highest average bandwidth recorded, wherein the highest average bandwidth recorded is based on recorded average bandwidths for iterations over a predefined period, each iteration having a corresponding number of concurrent network calls, wherein the target number of concurrent calls is used during at least a portion of the data transfer session.

11. The media of claim 10, wherein the data transfer session is between a private enterprise system having the one or more data-source devices and a cloud computing platform having one or more data-destination devices.

12. The media of claim 10, wherein analyzing the transfer parameters comprises retrieving values, from each of the one or more data-source devices, for two or more of the following:
a network card connection speed;
a local network type;
a hardware of the one or more data-source devices comprising a computer processing unit (CPU) speed and memory size;
a total size of source files to be transferred;
a priority associated with the source files;
a geographic location of the one or more data-target devices;
a geographic location of the one or more data-source devices;
a current date and time of the geographic location of the one or more data-source devices; and
a current date and time of the geographic location of the one or more data-target devices.

13. The media of claim 12, wherein calculating the optimum number of concurrent network calls comprises:
comparing each value associated with each of the transfer parameters of each of the one or more data-source devices to a corresponding threshold criteria; and
configuring a sum of the default optimum number of concurrent calls and an added number of network calls based on exceeding the corresponding threshold criteria for a selected transfer parameter as the optimum number of concurrent network calls.

14. The media of claim 10, wherein the triggering event is the predefined period of time that expires, wherein determining the number of concurrent network calls that corresponds to the highest average bandwidth recorded comprises:
recording an average bandwidth of the data transfer session for a predefined period of each iteration and each additional period while increasing the default number of concurrent network calls for the data transfer session during each additional period; and
when the default number of concurrent network calls has been increased to match the optimum number of concurrent network calls, evaluating each recorded average bandwidth and a number of concurrent network calls for each recorded average bandwidth to identify the highest average bandwidth recorded.

15. The media of claim 14, wherein upon a second triggering event, identifying the target number of concurrent calls is based on:
dynamically recalculating the optimum number of concurrent network calls for the data transfer session; and
allocating the optimum number of concurrent network calls for the data transfer session.

16. The media of claim 15, wherein the second triggering event is a change in at least one data transfer parameter, wherein the change is identified based on monitoring the data transfer parameters for the one or more data-source devices.

17. The media of claim 10, wherein allocating the number of concurrent network calls for the data transfer session comprises:
determining a size of each individual file to be transferred from the one or more data-source devices; and
assigning a portion of the number of concurrent network calls to each individual file in proportion to a size of the individual file.

18. A method for optimizing data transfer between private enterprise systems and cloud computing platforms, the method comprising:
initiating a data transfer session, the data transfer session associated with a default number of concurrent calls, wherein initiating the data transfer comprises analyzing transfer parameters for one or more data-source devices;
calculating an optimum number of concurrent network calls for the data transfer session based on the transfer parameters, wherein calculating an optimum number of concurrent network calls comprises:
comparing each value associated with each of the transfer parameters of each of the one or more data-source devices to a corresponding threshold criteria; and
configuring a sum of a default optimum number of concurrent calls and an added number of network calls, based on a selected transfer parameter meeting or exceeding the corresponding threshold criteria, as the optimum number of concurrent network calls; and allocating the default number of concurrent network calls for the data transfer session during a predefined period:

identifying a target number of concurrent network calls for the data transfer session, wherein identifying the target number of concurrent network calls comprises performing the following, two or more times:

recording an average bandwidth of the data transfer session for during the predefined period and each additional period; and increasing an allocated number of concurrent network calls by adding to the default number of concurrent network calls for the data transfer session during an additional period;

when the allocated number of concurrent network calls has been increased to match the optimum number of concurrent network calls, evaluating each recorded average bandwidth and a number of concurrent network calls for each recorded average bandwidth to identify a highest average bandwidth recorded; and allocating the target number of concurrent network calls for the data transfer session, wherein the target number of concurrent network calls is the number of concurrent network calls that corresponds to the highest average bandwidth recorded.

19. The method of claim 18, wherein the data transfer parameters include eac-14 one or more of the following:
   a network card connection speed;
   a local network type;
   a hardware of the one or more data-source devices comprising a computer processing unit (CPU) speed and memory size;
   a total size of source files to be transferred;
   a priority associated with the source files;
   a geographic location of the one or more data-target devices;
   a geographic location of the one or more data-source devices;
   a current date and time of the geographic location of the one or more data-source devices; and
   a current date and time of the geographic location of the one or more data-target devices.

20. The method of claim 18, further comprising causing display of a graphical user interface (GUI) comprising graphical representations of the transfer parameters, wherein the GUI further includes graphical representations that support:
   pausing the data transfer session; and
   resuming the data transfer session.

* * * * *